(12) United States Patent
Okauchi (10) Patent No.: US 12,033,814 B2
(45) Date of Patent: Jul. 9, 2024

(54) SWITCHING DEVICE AND IMAGE FORMING APPARATUS

(71) Applicant: KYOCERA Document Solutions Inc., Osaka (JP)

(72) Inventor: Yoshifumi Okauchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 148 days.

(21) Appl. No.: 17/406,958

(22) Filed: Aug. 19, 2021

(65) Prior Publication Data

US 2022/0059301 A1 Feb. 24, 2022

(30) Foreign Application Priority Data

Aug. 21, 2020 (JP) ................. 2020-139938

(51) Int. Cl.
*H01H 13/52* (2006.01)
*H01H 13/04* (2006.01)
*H01H 13/14* (2006.01)
*G03G 15/00* (2006.01)

(52) U.S. Cl.
CPC ............ *H01H 13/52* (2013.01); *H01H 13/04* (2013.01); *H01H 13/14* (2013.01); *G03G 15/80* (2013.01); *H01H 2013/525* (2013.01)

(58) Field of Classification Search
CPC ........ H01H 13/52; H01H 13/04; H01H 13/14; H01H 2013/525; H01H 3/12; H01H 9/02; H01H 9/0271; H01H 13/10; H01H 13/50; H01H 2223/03; H01H 2223/034; H01H 2223/044; G03G 15/80; G03G 15/5016; H04N 1/00885; G05G 15/00
See application file for complete search history.

(56) References Cited

U.S. PATENT DOCUMENTS

| | | | |
|---|---|---|---|
| 6,486,419 B2 | 11/2002 | Horiguchi et al. | |
| 8,542,482 B2* | 9/2013 | Hsiung | H01H 13/705 200/341 |
| 2015/0332872 A1* | 11/2015 | Konishi | H01H 13/02 200/341 |
| 2016/0042889 A1* | 2/2016 | Satou | H01H 13/14 200/293 |

FOREIGN PATENT DOCUMENTS

| | | |
|---|---|---|
| JP | H11-220559 A | 8/1999 |
| JP | 2007-213911 A | 8/2007 |
| JP | 2011-248172 A | 12/2011 |

* cited by examiner

*Primary Examiner* — Lheiren Mae A Caroc
(74) *Attorney, Agent, or Firm* — Studebaker & Brackett PC (57) ABSTRACT

A switching device includes a keytop and a switching part. The keytop is exposed from an opening of an exterior cover of a housing. The switching part is pushed by the keytop. The switching part includes a head portion on which a pushing operation is received and a cover portion covering the opening of the exterior cover around the head portion. The cover portion forms an exterior appearance of the housing together with the exterior cover.

5 Claims, 8 Drawing Sheets

Comparative Example

FIG. 4

Comparative Example

SWITCHING DEVICE AND IMAGE FORMING APPARATUS

INCORPORATION BY REFERENCE

This application is based on and claims the benefit of priority from Japanese patent application No. 2020-139938 filed on Aug. 21, 2020, which is incorporated by reference in its entirety.

BACKGROUND

The present disclosure relates to a switching device and an image forming apparatus.

An image forming apparatus is provided with a switching device for a main power source. As the switching device of this type, a switching device in which an operation button exposed outside from a housing is covered with an opening and closing cover is known. The switching device is a so-called rocker switch, and by pushing the end portions of the operation bottom alternatively so as to rock it, an ON state and an OFF state are switched. On the outer surface of the housing, a concave surface is formed, and the one end of the operation button is protruded from the concave surface. The concave surface is covered with the opening and closing cover, and then the housing and the opening and closing cover are on the same plane to improve the exterior appearance.

However, in the above switching device, the opening and closing cover must be opened in order to push the operation button, and in a state where the opening and closing cover is opened, the operation button protrudes from the concave surface of the housing to deteriorate the exterior appearance. Therefore, it is necessary to provide the opening and closing cover in the housing in order to hide the operation button, and there is a problem that the configuration of the device becomes complicated and the cost thereof increases.

SUMMARY

In accordance with an aspect of the present disclosure, a switching device includes a keytop and a switching part. The keytop is exposed from an opening of an exterior cover of a housing. The switching part is pushed by the keytop. The switching part includes a head portion on which a pushing operation is received and a cover portion covering the opening of the exterior cover around the head portion. The cover portion forms an exterior appearance of the housing together with the exterior cover.

In accordance with an aspect of the present disclosure, an image forming apparatus includes the switching device and an image forming part which forms an image on a sheet.

The other features and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Figure 1:
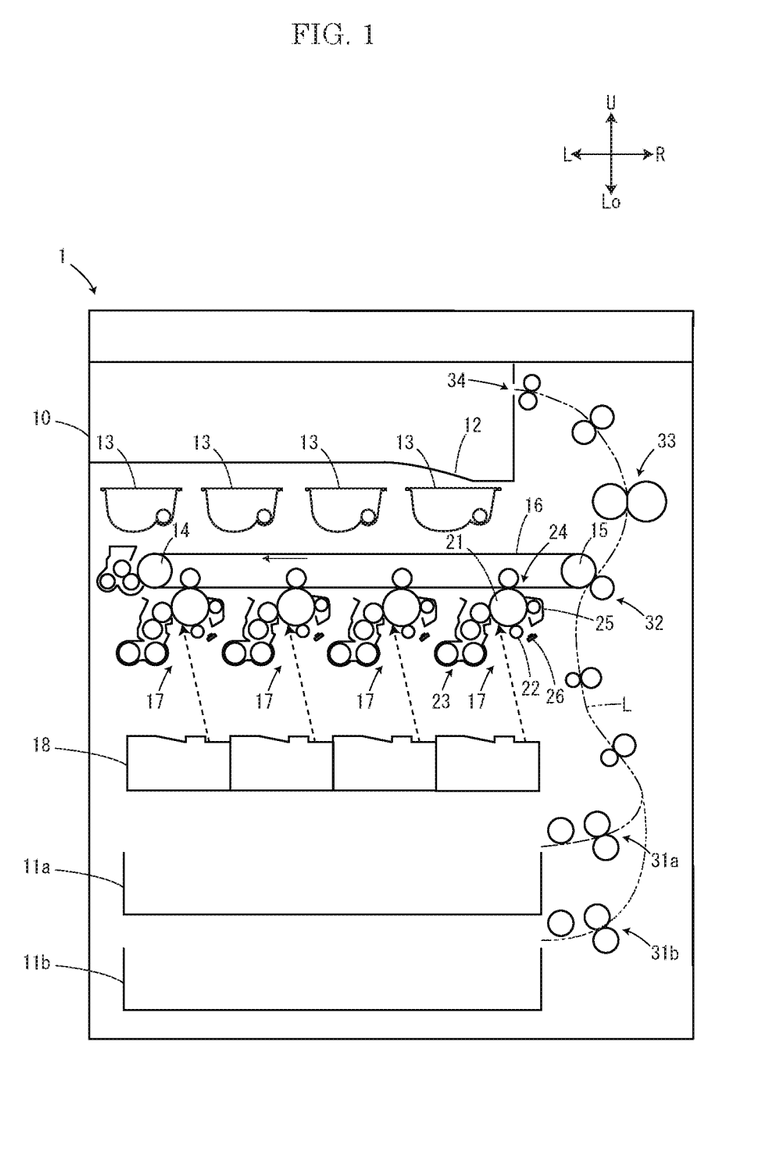
FIG. 1 is a view schematically showing a printer according to the present embodiment.

Hereinafter, with reference to the attached drawings, an image forming apparatus including a switching device according to the present embodiment will be described. In the following description, a printer 1 will be described as an example of the image forming apparatus. FIG. 1 is a view schematically showing the printer 1 according to the present embodiment. Fr, Re, U, Lo, L and R marked in each figure indicate a front side, a rear side, an upper side, a lower side, a right side and a left side of the printer 1, respectively.

As shown in FIG. 1, the printer 1 includes a box-shaped housing 10 in which various devices are stored. In the lower portion of the housing 10, sheet feeding cassettes 11a and 11b in which a bundle of sheets is set are stored, and in the upper portion of the housing 10, a sheet discharge tray 12 on which the image-formed sheet is stacked is provided. Below the sheet discharge tray 12, toner containers 13 containing toners of four colors (for example, magenta, cyan, yellow, and black) are detachably set. Below the toner containers 13, an intermediate transfer belt 16 stretched between right and left rollers 14 and 15 is provided.

Along the lower side of the intermediate transfer belt 16, image forming parts 17 for the colors of the toner are provided in a row along the left-and-right direction. In each image forming part 17, a photosensitive drum 21 is provided so as to be rotated in contact with the intermediate transfer belt 16. Around the photosensitive drum 21, a charger 22, a development device 23, a primary transferring part 24, a cleaning device 25, and an eraser 26 are disposed in the order of primary transferring process. A waste toner box (not shown) is connected to the cleaning devices 25. The toner is supplied to each development device 23 from the corresponding toner container 13 through a supply path (not shown), and the waste toner is discharged to the waste toner box from each cleaning device 25 through a discharge path (not shown).

Below the image forming parts 17, an exposure device 18 constituted by a laser scanning unit (LSU) is provided. In the right side portion of the housing 10, a conveyance path L for the sheet from the sheet feeding cassettes 11a and 11b to the sheet discharge tray 12 is formed by a plurality of rollers. At the upstream end (the lower side) of the conveyance path L, sheet feeding parts 31*a* and 31*b* are provided, and a secondary transfer area 32 is provided on the right end side of the intermediate transfer belt 16 on the downstream side of the sheet feeding parts 31*a* and 31*b* on the conveyance path L. A fixing device 33 is provided on the downstream side of the secondary transfer area 32 on the conveyance path L, and a sheet discharge port 34 is provided on the downstream side (the upper side) of the fixing device 33 on the conveyance path L.

When an image forming operation is performed by the printer 1, after the surface of the photosensitive drum 21 is charged by the charger 22, an electrostatic latent image is formed on the surface of the photosensitive drum 21 by laser beam emitted from the exposure device 18. Next, the toner is supplied to the electrostatic latent image on the surface of the photosensitive drum 21 from the development device 23 to form a toner image, and the toner image is primarily transferred from the surface of the photosensitive drum 21 to the surface of the intermediate transfer belt 16. In each image forming part 17, the toner image of each color is primarily transferred to the intermediate transferring belt 16 to form a full-color toner image on the surface of the intermediate transfer belt 16. The waste toner and the electric charge remaining on the photosensitive drum 21 are removed by the cleaning device 25 and the eraser 26.

On the other hand, the sheet is fed from the sheet feeding cassettes 11*a* and 11*b* or a manual sheet feeding tray (not shown) by the sheet feeding parts 31*a* and 31*b*, and the fed sheet is conveyed toward the secondary transfer area 32 in synchronization with the image forming operation described above. In the secondary transfer area 32, the full-color toner image is secondarily transferred from the surface of the intermediate transfer belt 16 to the surface of the sheet, and the sheet on which the toner image is transferred is conveyed toward the fixing device 33 downstream of the secondary transfer area 32. In the fixing device 33, the toner image is fixed to the sheet, and the sheet on which the toner image is fixed is discharged through the sheet discharge port 34 on the sheet discharge tray 12. In this manner, the toner image transferred on the sheet passes through the fixing device 33 to form the image on the surface of the sheet.

Figure 2:
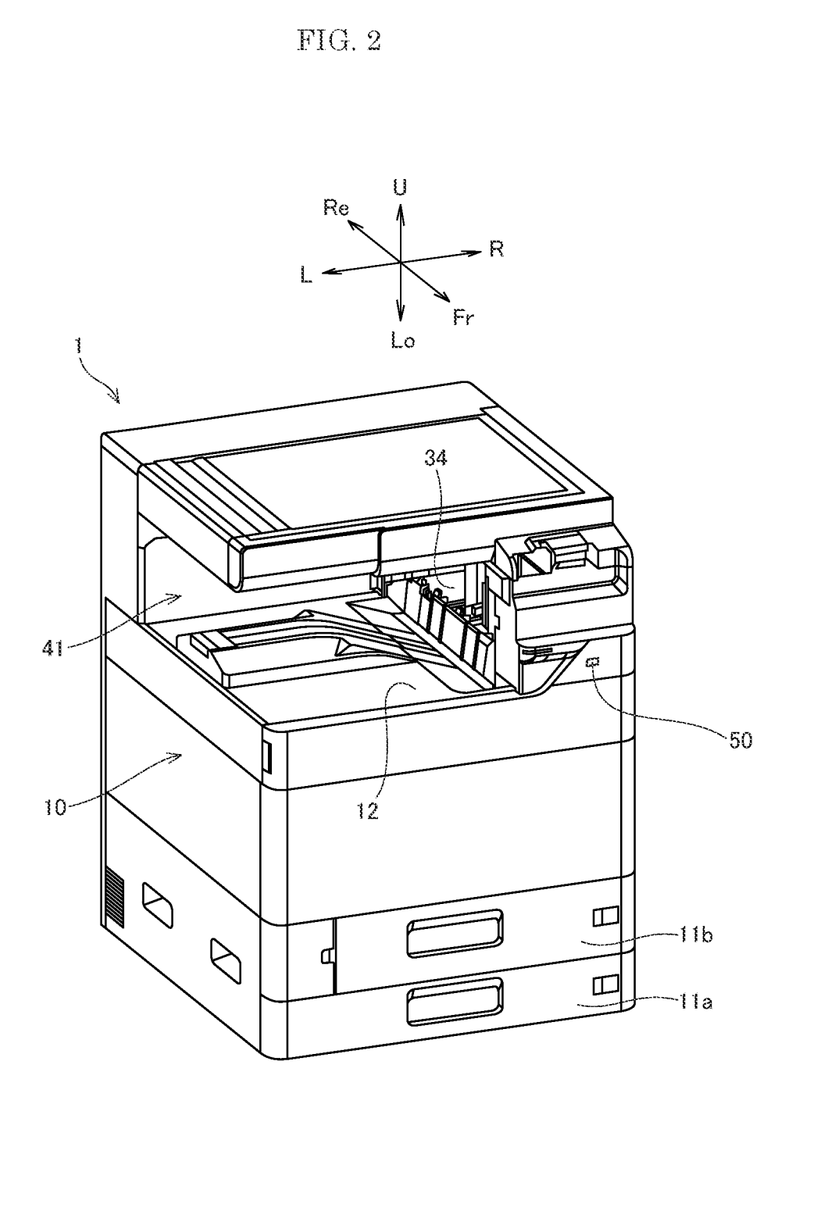
FIG. 2 is a perspective view showing an exterior appearance of the printer according to the present embodiment.

As shown in FIG. 2, the housing 10 of the printer 1 is formed with an in-body space 41, and the housing 10 has the sheet discharge port 34 opened to the in-body space 41. A bottom surface of the in-body space 41 serves as the sheet discharge tray 12, and the sheet discharged through the sheet discharge port 34 to the in-body space 41 is stacked on the sheet discharge tray 12. On the front surface of the housing 10, a power switch (a switching device) 50 is provided on the right side of the in-body space 41, and the periphery of the power switch 50 has a large influence on the exterior appearance of the printer 1. Therefore, in the front surface of the housing 10, there is a need for a unity in the appearance between the power switch 50 and the housing 10.

Figure 3:
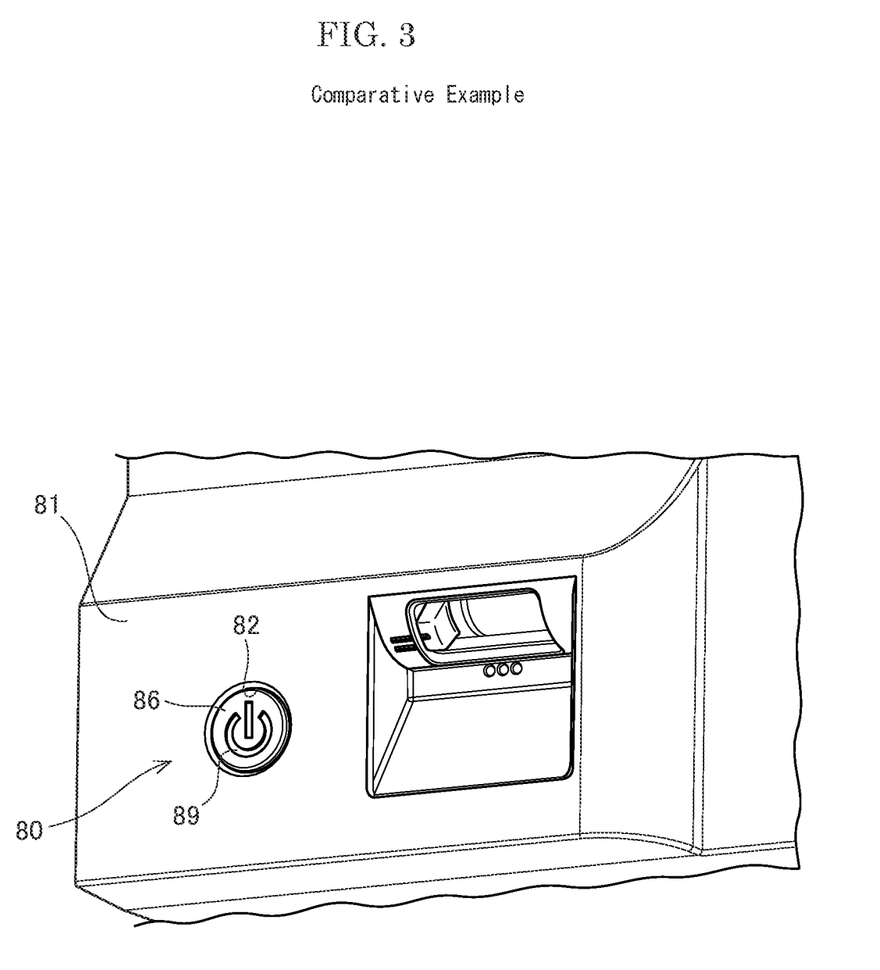
FIG. 3 is a perspective view showing an exterior appearance of a power switch and its periphery according to a comparative embodiment.

For example, in a power switch 80 of a comparative example shown in FIG. 3, an operation surface of a keytop 86 is exposed from an opening 82 of an exterior cover 81 of a housing. On almost the whole area of the operation surface of the keytop 86, a switch mark 89 is marked. The switch mark 89 is surrounded with the opening edge, and the operation surface of the keytop 86 is emphasized more than the outer surface of the exterior cover 81. In the power switch 80 of the comparative example, the mounting accuracy of the keytop 86 varies due to the mounting structure, and it is difficult to place the operation surface of the keytop 86 on the same surface as the outer surface of the exterior cover 81. For example, the keytop 86 may protrude from the outer surface of the exterior cover 81 to deteriorate the exterior appearance.

Figure 4:
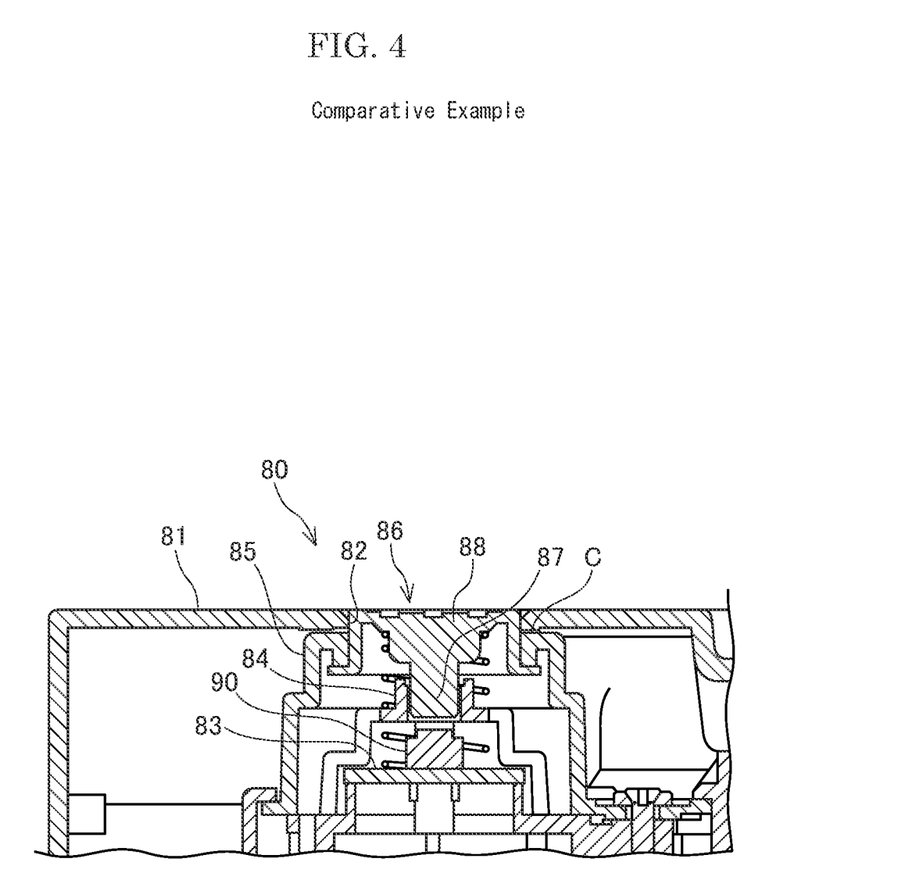
FIG. 4 is a sectional view showing the power switch and its periphery according to the comparative embodiment.

Specifically, as shown in FIG. 4, in the power switch 80 of the comparative example, a switching part 90 is mounted on a base board 83, and the keytop 86 is provided so as to face the switching part 90. A boss portion 87 of the keytop 86 is guided by a first holder 84, and a head portion 88 of the keytop 86 is guided by a second holder 85. The second holder 85 is covered with the exterior cover 81 from the outside, and the head portion 88 of the key op 86 protruding from the second holder 85 enters the opening 82 of the exterior cover 81. When a gap C between the exterior cover 81 and the second holder 85 has a difference in the operation direction of the keytop 86, the head portion 88 of the keytop 86 protrudes from the outer surface of the exterior cover 81.

As described above, in the power switch 80 of the comparative example, the keytop 86 is assembled by the first and second holders 84 and 85 inside the exterior cover 81, and therefore the assembling structure becomes complicated, and an assembling error of the keytop 86 to the opening 82 of the exterior cover 81 easily occurs. Therefore, in the power switch 80 of the comparative example, it is difficult to achieve a unity in the appearance between the power switch 80 and the exterior cover 81. Further, if the center of the keytop 86 held by the first and second holders 84 and 85 do not coincident with the center of the opening 82 of the exterior cover 81, the keytop 86 is hollowed out by the opening edge of the exterior cover 81 to deteriorate the operability.

Figure 7:
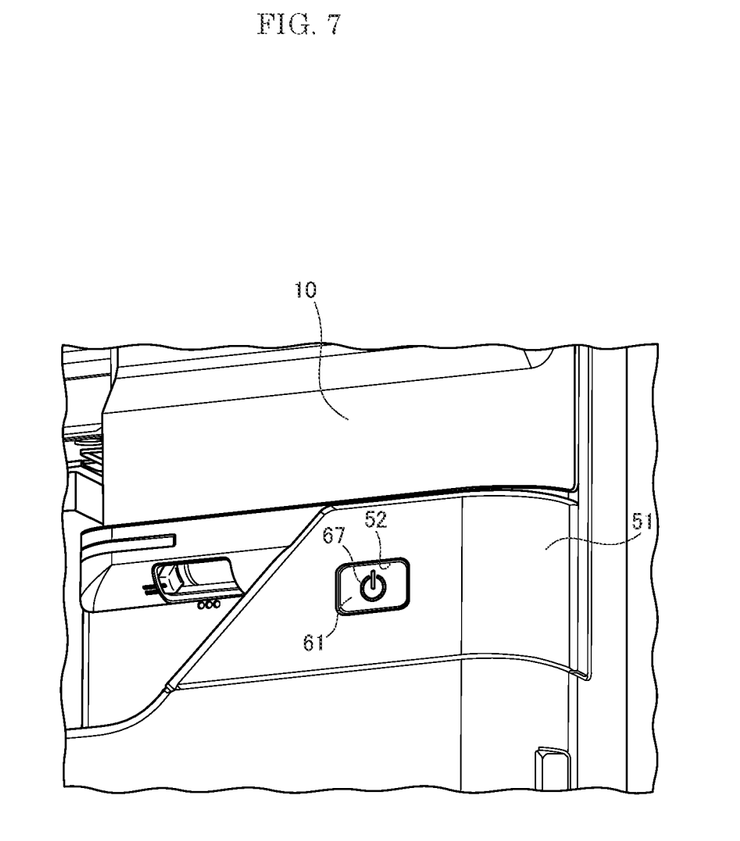
FIG. 7 is a perspective view showing an exterior appearance of the power switch and its periphery in a state where an exterior cover is attached, according to the present embodiment.

Therefore, in the present embodiment, an operation surface of a keytop 61 and the outer surface of the exterior cover 51 is brought close in the appearance by a cover portion 64 extending from a head portion 62 of the keytop 61 to the periphery (see FIG. 7). Moreover, the assembling structure of the key top 61 is made to be simple, and the protrusion of the keytop 61 from the outer surface of the exterior cover 51 is suppressed. As a result, a unity in the appearance between the power switch 50 and the exterior cover 51 is achieved. Further, the simplification of the assembling structure of the key top 61 makes it easy to position the keytop 61 with respect to the opening 52 of the exterior cover 51, thereby suppressing the deterioration of the operability of the keytop 61.

Figure 5:
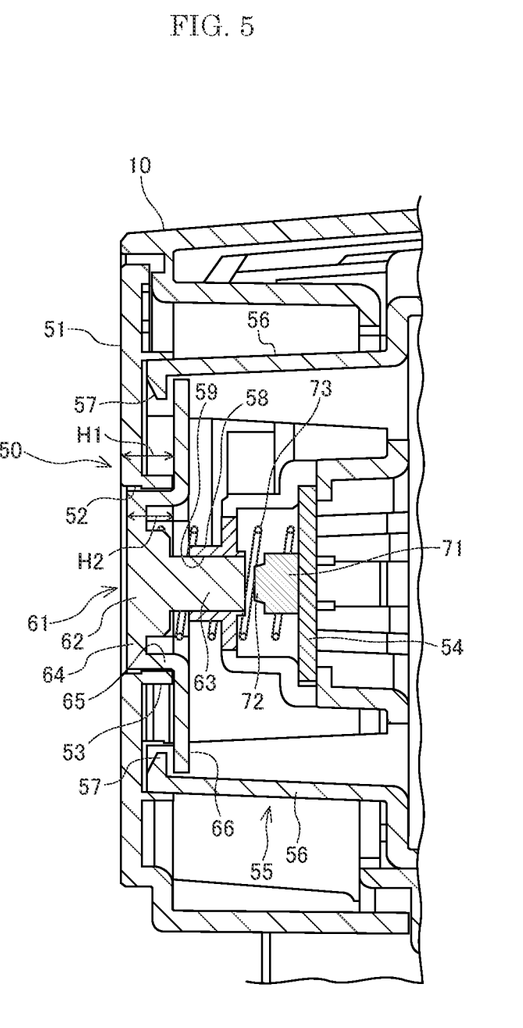
FIG. 5 is a vertical sectional view showing a power switch and its periphery according to the present embodiment.
Figure 6:
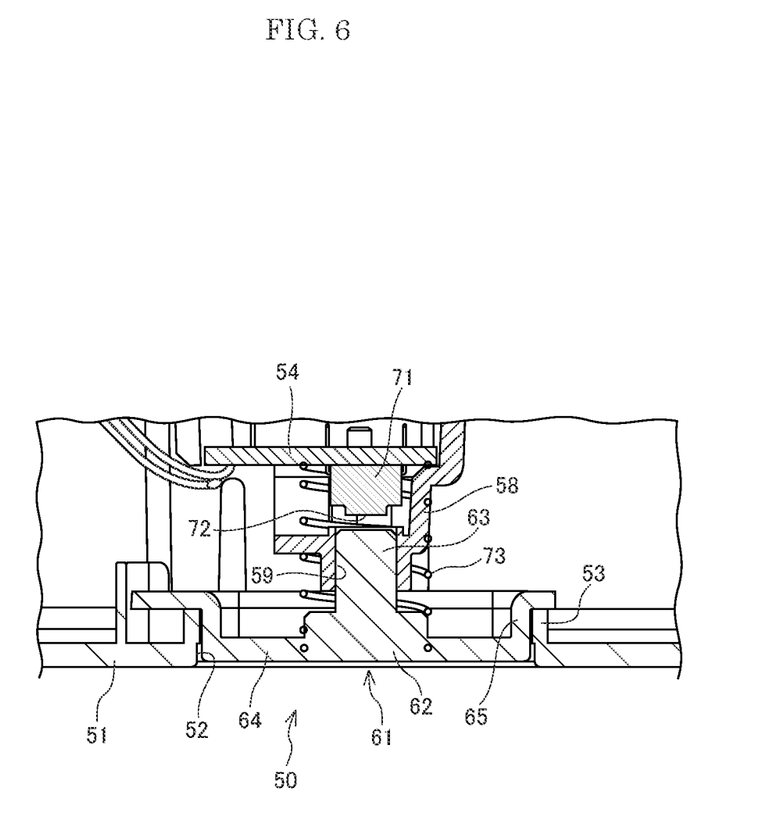
FIG. 6 is a horizontal sectional view showing the power switch and its periphery according to the present embodiment.

The power switch 50 will be described with reference to FIG. 5 to FIG. 7. FIG. 5 is a vertical sectional view showing the power switch 50 and its periphery according to the present embodiment. FIG. 6 is a horizontal sectional view showing the power switch 50 and its periphery according to the present embodiment. FIG. 7 is a perspective view showing an exterior appearance of the power switch 50 and its periphery in a state where the exterior cover 51 is attached, according to the present embodiment.

As shown in FIG. 5 and FIG. 6, the power switch 50 is a so-called push-button switch, and is mounted inside the exterior cover 51 of the housing 10. The power switch 50 includes the keytop 61 exposed from the opening 52 of the exterior cover 51, and a switching part 71 pushed by the keytop 61. The keytop 61 is supported on a base board 54 by a spring 73, and the switching part 71 is mounted on the base board 54 inside the spring 73. The switching part 71 projects a stem 72 from a switch main body, and when the stem 72 is pushed by the keytop 61, a power supply and an interruption of the power supply to the printer 1 is switched.

The keytop 61 receives the pushing operation by the head portion 62 exposed from the opening 52 of the exterior cover 51. A boss portion 63 extends from the head portion 62 of the keytop 61 toward the switching part 71, and the boss portion 63 is inserted into a guide hole 59 of a holder 58 provided inside the housing 10. The tip side portion of the keytop 61 is guided in the pushing direction by the guide hole 59 of the holder 58 and the boss portion 63. The opening 52 of the exterior cover 51 is formed larger than the head portion 62 of the keytop 61, and the cover portion 64 is extended from the head portion 62 toward the opening edge. The opening 52 around the head portion 62 is covered with the cover portion 64 of the keytop 61.

The outer edge of the cover portion 64 is formed to have the same shape as the opening edge of the exterior cover 51, and the cover portion 64 is positioned by the opening edge of the exterior cover 51. A circumferential wall 65 projects from the outer edge of the cover portion 64 to the inside of the exterior cover 51, and a guide wall 53 projects from the opening edge of the exterior cover 51 to the inside of the exterior cover 51. The operation surface side portion of the keytop 61 is guided in the pushing direction by the guide wall 53 of the exterior cover 51 and the circumferential wall 65. Although the keytop 61 is guided by the guide hole 59 of the holder 58 and the guide wall 53 of the exterior cover 51, a slight gap is formed between the guide surfaces of the guide hole 59 and the guide wall 53 and the sliding surface of the keytop 61.

Inside the exterior cover 51, a flange portion 66 extends from the projecting end of the circumferential wall 65 toward the periphery. The keytop 61 is biased in a direction separating from the switching part 71 by the spring 73, and the flange portion 66 of the keytop 61 comes into contact with the guide wall 53 of the exterior cover 51, so that the keytop 61 is prevented from coming off from the exterior cover 51. A switch case 55 is provided inside the exterior cover 51, and the flange portion 66 of the keytop 61 is hooked to claw portions 57 formed at tip ends of a pair of support walls 56 of the switch case 55. The keytop 61 is temporarily fixed by hooking of the flange portion 66 when the power switch 50 is assembled.

The support walls 56 face each other on both the sides of the keytop 61, and the opposing surfaces of the support walls 56 are slightly inclined such that the interval between the support walls 56 increases from the outside to the inside of the exterior cover 51. Before the exterior cover 51 is attached to the housing 10, the keytop 61 is temporarily fixed to the claw portions 57 of the pair of support walls 56 in a state in which a slight rocking of the keytop 61 is allowed owing to the inclination of opposing surfaces of the support walls 56. Since the assembling error is absorbed by the rocking of the keytop 61, it becomes easy to position the opening 52 of the exterior cover 51 to the keytop 61 when the exterior cover 51 is attached to the housing 10.

As shown in FIG. 7, when the exterior cover 51 is attached to the housing 10, the rectangular operation surface of the keytop 61 is exposed from the opening 52 of the exterior cover 51. A switch mark 67 is marked on the center portion of the operation surface of the keytop 61, that is, the outer surface of the head portion 62 (see FIG. 5), and nothing is marked on the cover portion 64 (see FIG. 5) connected to the head portion 62. The cover portion 64 forms the exterior surface of the housing 10 together with the exterior cover 51, and the operation surface of the keytop 61 is not emphasized more than the outer surface of the exterior cover 51. Then, the appearance of the keytop 61 and the exterior cover 51 becomes close to each other, and a unity in the appearance between the keytop 61 and the exterior cover 51 is achieved.

With reference to FIG. 5 again, against the spring force of the spring 73, the flange portion 66 of the keytop 61 is pushed in by the guide wall 53 of the exterior cover 51. A dimension H1 between the outer surface of the exterior cover 51 and the projecting end of the guide wall 53 and a dimension H2 between the operation surface of the keytop 61 and the surface of the flange portion 66 are substantially equal to each other. Therefore, even if the keytop 61 largely protrudes from the switch case 55 before the attaching of the exterior cover 51, the keytop 61 is pushed in the guide wall 53 by the attaching of the exterior cover 51, and the outer surface of the exterior cover 51 and the operation surface of the keytop 61 are on the same plane. Therefore, the keytop 61 does not protrude from the outer surface of the exterior cover 51.

Figure 8A:
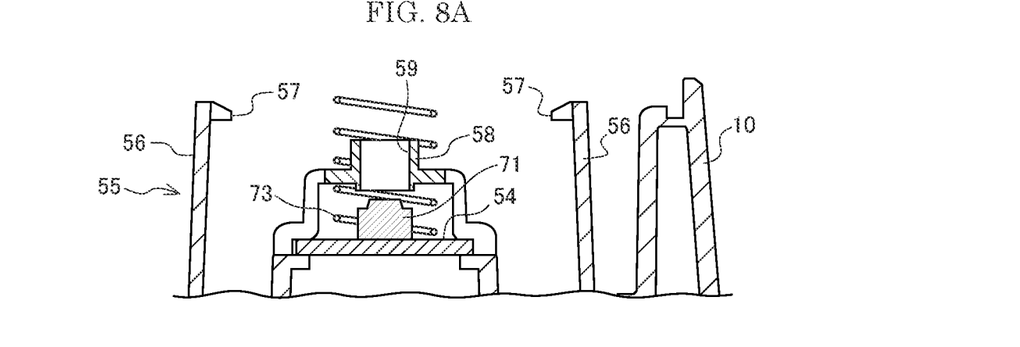
FIG. 8A is a transition diagram showing an assembling operation of the power switch according to the present embodiment.
Figure 8B:
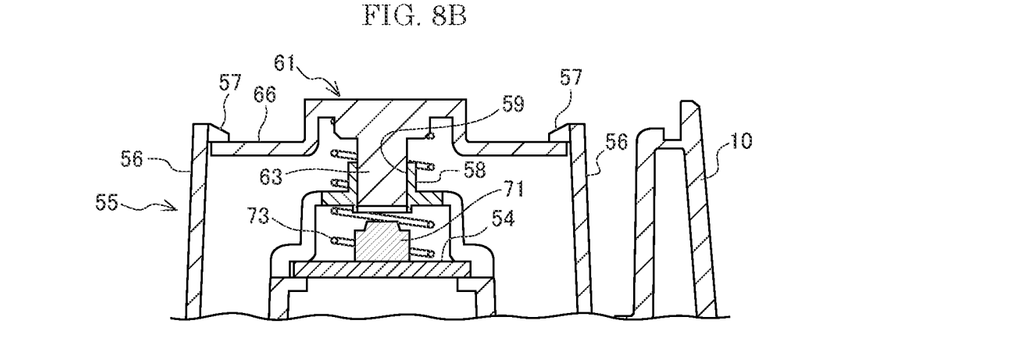
FIG. 8B is a transition diagram showing an assembling operation of the power switch according to the present embodiment.
Figure 8C:
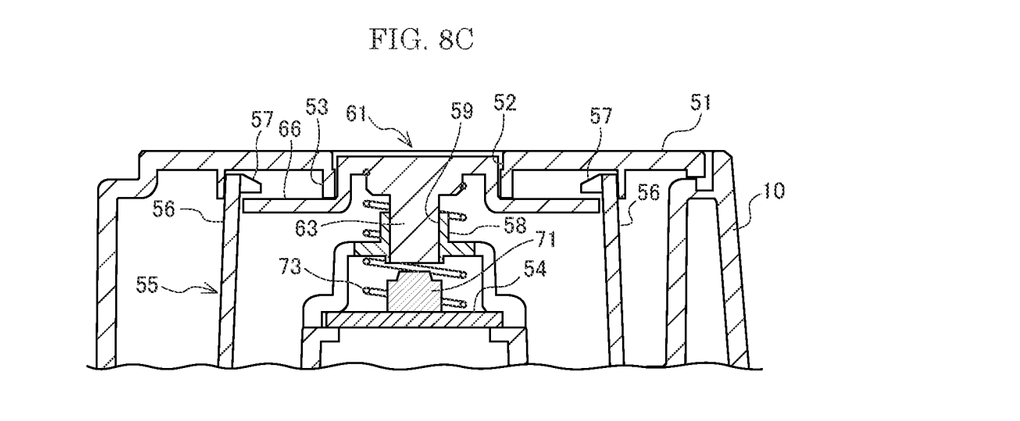
FIG. 8C is a transition diagram showing an assembling operation of the power switch according to the present embodiment.

With reference to FIG. 8A to FIG. 8C, the assembling operation of the power switch 50 will be described. FIG. 8A to FIG. 8C are transition diagrams of the assembling operation of the power switch 50 of the present embodiment.

As shown in FIG. 8A, the base board 54 is attached to the housing 10 together with the switch case 55. The switching part 71 is mounted on the base board 54, and the guide hole 59 of the holder 58 is opened so as to face the switching part 71. The spring 73 is mounted on the base board 54 around the switching part 71. The switch case 55 is provided with the pair of support walls 56 on both the sides of base board 54, and the claw portions 57 protrude inward from the tip ends of the pair of support walls 56. An installation space for the keytop 61 (see FIG. 8B) is formed inside the pair of support walls 56.

Next, as shown in FIG. 8B, the boss portion 63 of the keytop 61 is inserted into the guide hole 59 of the holder 58, and the keytop 61 is temporarily fixed to the switch case 55. The keytop 61 is biased in the direction separating from the base board 54 by the spring 73, and the flange portion 66 of the keytop 61 is hooked to the claw portions 57 of the pair of support walls 56. As described above, the opposing surfaces of the pair of support walls 56 are slightly inclined, and a slight gap is formed between the sliding surface of the boss portion 63 of the keytop 61 and the guide surface of the guide hole 59 of the holder 58. Therefore, in a state where the keytop 61 is temporarily fixed to the switch case 55, a slight rocking of the keytop 61 is allowed.

Next, as shown in FIG. 8C, the exterior cover 51 is attached to the housing 10, and the operation surface of the keytop 61 is exposed from the opening 52 of the exterior cover 51. At this time, even if a difference is formed between the center of the opening 52 of the exterior cover 51 and the center of the keytop 61, the slightly rocking of the keytop 61 makes it possible to align the center of the opening 52 of the exterior cover 51 with the center of the keytop 61. Because the rocking of the keytop 61 absorbs the difference in position between the members, the keytop 61 is properly positioned by the opening edge of the exterior cover 51. When the keytop 61 is operated, the keytop 61 is not hollowed out on the opening edge of the exterior cover 51 so that the operability of the keytop 61 is improved.

Further, the flange portion 66 of the keytop 61 is pushed in by the guide wall 53 of the exterior cover 51, and the outer surface of the exterior cover 51 and the operation surface of the keytop 61 are substantially on the same plane. Therefore, the keytop 61 does not protrude from the outer surface of the exterior cover 51, and the unity in the appearance between the exterior cover 51 and the keytop 61 is obtained. Furthermore, since the opposing surfaces of the pair of support walls 56 are inclined, when the keytop 61 is operated, the opposing surfaces of the pair of support walls 56 are separated from the tip of the flange portion 66. The keytop 61 is guided at two positions, that is, the guide hole 59 of the holder 58 and the guide wall 53 of the exterior cover 51, so that the operation of the keytop 61 is not inhibited by the pair of support walls 56 even if the assembling error occurs in the switch case 55.

As described above, according to the present embodiment, the cover portion 64 of the keytop 61 and the exterior cover 51 form the exterior surface of the housing 10, and the keytop 61 and the exterior cover 51 exposed from the opening 52 of the exterior cover 51 is close to each other in the appearance. Thus, the unity in the appearance between the housing 10 and the keytop 61 can be achieved by an inexpensive and simple constitution where the cover portion 64 is formed in the keytop 61.

In addition, since the power switch 50 of the present embodiment is installed in the printer 1, the appearance of the printer 1 is improved.

Although the power switch 50 is shown as an example of the switching device in the present embodiment, the switching device can be applied to other switch devices other than the power switch 50.

In the present embodiment, a tact switch in which the stem 72 is protruded from the switch body is shown as an example of the switch part 71, but the switch part 71 is not particularly limited as long as it is a switch part pressed by the keytop 61.

Further, in the present embodiment, although the outer edge shape of the keytop 61 is formed in a rectangular shape when viewed from the front side, the outer edge shape of the keytop 61 may be along the opening edge shape of the exterior cover.

Further, in the present embodiment, the flange portion 66 is hooked to the pair of support walls 56 and the keytop 61 is temporarily fixed, but the flange portion 66 may be positioned by the pair of support walls 56 in a state where the keytop 61 is temporarily fixed.

The present embodiment shows the printer including the facsimile function as an example of the image forming apparatus, but the image forming apparatus may include another function such as a copying function.

Further, in the present embodiment, an example in which the switching device is applied to the image forming apparatus has been described, but the switching device can be applied to other electronic equipment.

In the present embodiment, the sheet may have a sheet-like shape for forming an image, for example, may contain a plain paper, a coated paper, a tracing paper, or an OHP (Over Head Projector) sheet.

Although the present embodiment has been described, as another embodiment, the above-described embodiment and the modified example may be wholly or partially combined.

Further, the technique of the present disclosure is not limited to the above-described embodiment, and various changes, substitutions, and modifications may be made without departing from the spirit of the technical idea. Furthermore, if technological advances or other derived technologies can realize the technical ideas in other ways, they may be implemented using such methods. Accordingly, the claims cover all embodiments that may be contained within the scope of the technical concept.

The invention claimed is:

1. A switching device comprising:
a keytop exposed from an opening of an exterior cover of a housing;
a switching part mounted on a base board and pushed by the keytop;
a spring arranged around the switching part and biasing the keytop in a direction separating from the switching part; and
a switch case attached to the housing and temporarily holding the keytop to the base board, wherein
the keytop includes a head portion on which a pushing operation is received, a cover portion covering the opening of the exterior cover around the head portion, a circumferential wall protruding from an outer edge of the cover portion to an inside of the exterior cover, and a flange portion extending from the circumferential wall, and
a guide wall is formed around an opening edge of the opening of the exterior cover so as to guide the circumferential wall in an operation direction of the keytop, wherein
before the exterior cover is attached to the housing, the flange portion is engaged with the switch case to hold the keytop to the switch case temporarily,
when the exterior cover is attached to the housing, the temporarily held keytop is pushed in by the guide wall so that the cover portion is positioned to the opening edge of the opening of the exterior cover, and
the cover portion forms an exterior appearance of the housing together with the exterior cover.

2. The switching device according to claim 1, wherein, the flange portion is hooked by a support wall provided inside the exterior cover, and the keytop is temporarily held by the switch case.

3. The switching device according to claim 2, wherein the guide wall and the support wall are separated from each other in a radial direction of the head portion.

4. The switching device according to claim 1, wherein a switch mark is marked on the keytop, and
the switch mark is marked on the head portion only.

5. An image forming apparatus comprising:
the switching device according to claim 1; and
an image forming part which forms an image on a sheet.

\* \* \* \* \*